United States Patent
Nakamata et al.

(10) Patent No.: US 8,112,093 B2
(45) Date of Patent: Feb. 7, 2012

(54) IUB/IUR HSDPA/HSUPA MOBILITY PROCEDURES WHEN RL ADDITION/RL DELETION CONDITION TRIGGERS SIMULTANEOUSLY, IN SRNC, WITH THE HS-DSCH/E-DCH SERVING CELL CHANGE CONDITION

(75) Inventors: Masatoshi Nakamata, Kanagawa (JP); Tuomas Hakuli, Oulu (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 11/509,302

(22) Filed: Aug. 23, 2006

(65) Prior Publication Data
US 2007/0049277 A1 Mar. 1, 2007

Related U.S. Application Data

(60) Provisional application No. 60/730,610, filed on Oct. 26, 2005, provisional application No. 60/726,320, filed on Oct. 12, 2005, provisional application No. 60/719,409, filed on Sep. 21, 2005, provisional application No. 60/710,981, filed on Aug. 23, 2005.

(51) Int. Cl.
*H04Q 7/20* (2006.01)

(52) U.S. Cl. .................. 455/452.2; 370/350

(58) Field of Classification Search ............... 370/331
See application file for complete search history.

(56) References Cited

U.S. PATENT DOCUMENTS

| 7,054,633 B2 * | 5/2006 | Seo et al. ................ 455/439 |
| 7,224,977 B2 * | 5/2007 | Cavalli et al. ............ 455/452.1 |
| 2002/0045451 A1 * | 4/2002 | Hwang et al. ............. 455/442 |
| 2002/0051431 A1 * | 5/2002 | Choi et al. ............... 370/331 |
| 2002/0094817 A1 * | 7/2002 | Rune et al. ............... 455/450 |
| 2002/0155464 A1 * | 10/2002 | Salceda et al. ............ 435/6 |
| 2003/0108027 A1 * | 6/2003 | Kim et al. ............... 370/345 |
| 2004/0123210 A1 * | 6/2004 | Baudry et al. ............ 714/748 |
| 2005/0111410 A1 * | 5/2005 | Bazar ..................... 370/331 |
| 2006/0089142 A1 * | 4/2006 | Vuorinen et al. .......... 455/436 |
| 2007/0155388 A1 | 7/2007 | Petrovic et al. |
| 2008/0069088 A1 * | 3/2008 | Petrovic et al. .......... 370/354 |

FOREIGN PATENT DOCUMENTS

| EP | 1432262 | 6/2004 |
| WO | 2005/018256 | 2/2005 |

OTHER PUBLICATIONS

"Mobility Management and Capacity Analysis for High Speed Downlink Packet Access in WCDMA," pp. 3388 to 3392, vol. 5, ISBN 0-7803-8521-7 Pub. 2004-IEEE 60th Vehicular Technology Conference. VTC2004-Fall, Sep. 26-29, 2004.

Japanese Office Action issued on Aug. 16, 2010 in Japanese counterpart application No. 2008-527530 (3 pages).

(Continued)

*Primary Examiner* — Dwayne Bost
*Assistant Examiner* — Joseph Dean, Jr.

(57) ABSTRACT

Data structure is shown for radio link addition messages and radio link deletion messages of a mobility procedure in a wireless telecommunications system, each message for at least temporary storage in a computer-readable medium during transfer of said message, wherein each radio link addition message and each radio link deletion message is a request including an optional information element identifying a connection frame number and an information element including a radio link identification. Various devices and methods are shown individually and in combination using this data structure.

32 Claims, 10 Drawing Sheets

OTHER PUBLICATIONS

English language translation of Japanese Office Action issued on Aug. 16, 2010 in Japanese counterpart application No. 2008-527530 (5 pages).

3GPP TS 25.308, V6.3.0 (Dec. 2004), 3rd Generation Partnership Project; Technical Specification Group Radio Access Network; High Speed Downlink Pack Access (HSDPA); Overall description; Stage 2 (Release 6), Sec. 9.5 and 10, Dec. 2004 (3 pages).

3GPP TS 25.433, V6.6.0 (Jun. 2005), 3rd Generation Partnership Project; Technical Specification Group Radio Access Network; UTRAN Iub interface Node B Application Part (NBAP) signalling (Release 6), Sec. 8.3, Jun. 2005 (8 pages).

R2-050513, "E-DCH Serving radio link set and cell update," 3GPP TSG-RAN WG2 meeting #46, Scottsdale, AZ, Feb. 14-18, 2005 (7 pages).

Chinese Office Action dated May 5, 2011 (4 pages) in parallel Chinese Patent Application No. 200680035889.0 and English translation thereof (7 pages) (11 pages total).

Vietnamese Examination Report dated May 12, 2011 (2 pages) in parallel Vietnamese Patent Application No. 1-2008-00724 and English translation thereof (1 page) (3 pages total).

Chinese Office Action dated Dec. 9, 2010 in parallel Chinese Patent Application No. 200680035889.0 (10 pages) together with English translation thereof (23 pages).

3GPP TR 25.931 V6.2.0 (Jun. 2005), 3rd Generation Partnership Project; Technical Specification Group RAN; UTRAN functions, examples on signalling procedures (Release 6), published Jun. 30, 2005, Valbonne, France (122 pages).

* cited by examiner

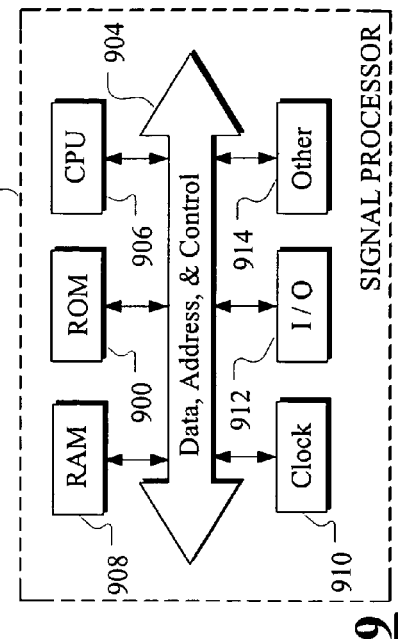
FIG. 9
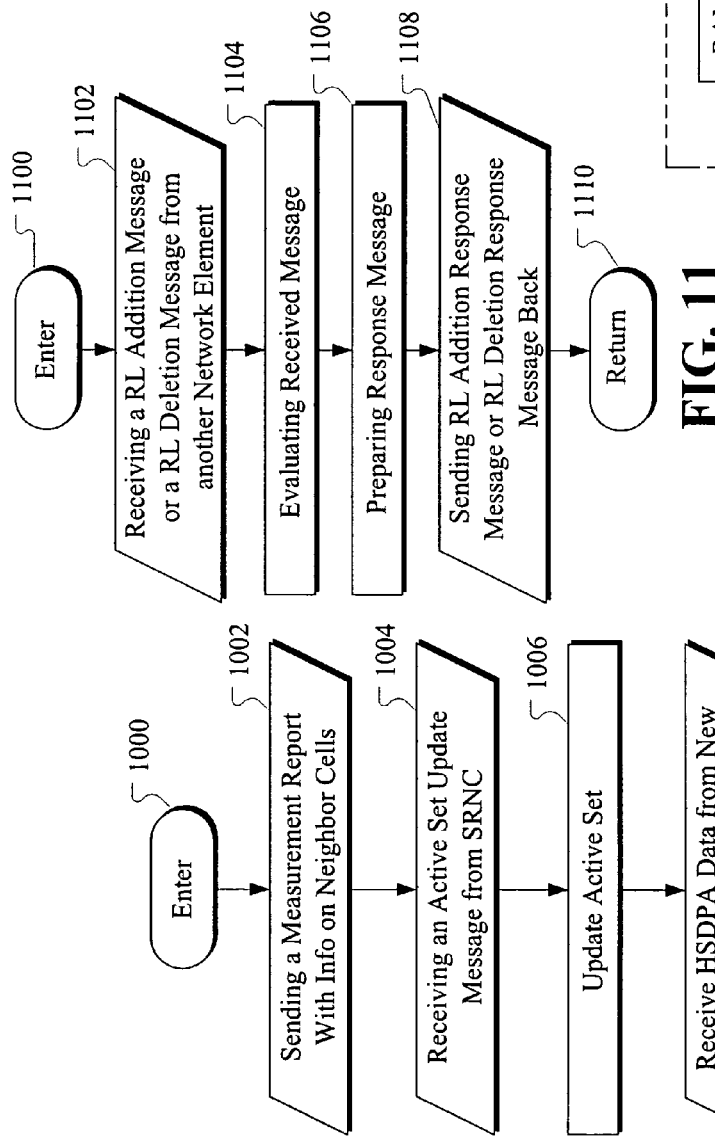
FIG. 11
FIG. 10

IUB/IUR HSDPA/HSUPA MOBILITY PROCEDURES WHEN RL ADDITION/RL DELETION CONDITION TRIGGERS SIMULTANEOUSLY, IN SRNC, WITH THE HS-DSCH/E-DCH SERVING CELL CHANGE CONDITION

CROSS-REFERENCE TO RELATED APPLICATIONS

This application claims priority from U.S. Provisional Application 60/730,610 filed Oct. 26, 2005, from U.S. Provisional Application 60/726,320 filed Oct. 12, 2005, from U.S. Provisional Application 60/719,409 filed Sep. 21, 2005, and from U.S. Provisional Application 60/710,981 filed Aug. 23, 2005.

BACKGROUND OF THE INVENTION

1. Technical Field

The field of the invention is mobile communications and although not limited thereto is disclosed in the context of the Universal Mobile Telecommunications System (UMTS) Terrestrial Radio Access (UTRA) of the Third Generation Partnership Project (3GPP). In that context, the invention is disclosed as related to mobility for high speed downlink packet access (HSDPA) and high speed uplink packet access (HSUPA), i.e., HS-DSCH/E-DCH Serving Cell Change which is possible currently only with the RL Reconfiguration procedure over the Radio Network Subsystem interfaces (Iub/Iur), but the invention is not limited to that specific technical environment.

2. Discussion of Related Art

Referring to FIG. 1, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over a (wired) Iu interface.

FIG. 2 shows some further details of the architecture, particularly the UTRAN. The UTRAN includes multiple Radio Network Subsystems (RNSs), each of which contains at least one Radio Network Controller (RNC). Each RNC may be connected to multiple Nodes B which are the 3GPP counterparts to GSM base stations (a second generation Radio Access Technology (RAT)). Each Node B may be in radio contact with multiple UEs via the radio interface (Uu) shown in FIG. 1. A given UE may be in radio contact with multiple Nodes B even if one or more of the Nodes B are connected to different RNCs. For instance a UE1 in FIG. 2 may be in radio contact with Node B 2 of RNS 1 and Node B 3 of RNS 2 where Node B 2 and Node B 3 are neighboring Nodes B. The RNCs of different RNSs may be connected by an Iur interface which allows mobile UEs to stay in contact with both RNCs while traversing from a cell belonging to a Node B of one RNC to a cell belonging to a Node B of another RNC. One of the RNCs will act as the "serving" or "controlling" RNC (SRNC or CRNC) while the other will act as a "drift" RNC (DRNC). A chain of such drift RNCs can even be established to extend from a given SRNC. The multiple Nodes B will typically be neighboring Nodes B in the sense that each will be in control of neighboring cells. The mobile UEs are able to traverse the neighboring cells without having to re-establish a connection with a new Node B because either the Nodes B are connected to a same RNC or, if they are connected to different RNCs, the RNCs are connected to each other. During such movements of a UE, it is sometimes required that radio links be added and abandoned so that the UE can always maintain at least one radio link to the UTRAN. This is called softhandover (SHO).

The handover function is based on radio measurements, and it is used to maintain the quality of service requested by the core network. The handover strategy employed by the network for radio link control determines the handover decision that will be made based on the measurement results reported by the UE/RNC and various parameters set for each cell. Network-directed handover might also occur for reasons other than radio link control, e.g., to control traffic distribution between cells. A given network operator determines the exact handover strategies, but possible types include 3G-3G handover, FDD soft/softer handover, FDD inter-frequency hard handover, FDD/TDD handover, TDD/FDD handover, TDD/TDD handover, 3G-2G handover and vice versa. Causes for initiation of a handover process are many, including uplink quality, uplink signal measurements, downlink, downlink signal measurements, distance, change of service, better cell, O&M intervention, directed retry, traffic, preemption, etc Regarding soft handover, it is described in 3G TR 25.922 v.3.1.0 (2000-03) at Chapter 5.1.4. There, soft handover is described as a handover in which the mobile station starts communication with a new Node B on a same carrier frequency, or sector of the same site (softer handover) performing at most a change of code. With reference to soft handover, the "active set" is defined as the set of Nodes B the UE is simultaneously connected to, i.e., the UTRA cells currently assigning a downlink DPCH to the UE constitute the active set. The soft handover procedure is composed of a number of single functions: (1) measurements, (2) filtering of measurements, (3) report of measurements results, (4) the soft handover algorithm, and (5) execution of handover.

The measurement of the monitored cells filtered in a suitable way trigger the reporting events that constitute the basic input of the soft handover algorithm. The definition of "active set", "monitored set", as well as the description of all reporting events, is given in TS 25.331, V6.6.0 (2005-06) "Radio Resource Control (RRC); Protocol Specification (Release 6)." Based on the measurements of the set of cells monitored, the soft handover function evaluates if any Node B should be added to (radio link addition), removed from (radio link removal), or replaced in (combined radio link addition and removal) the active set; performing then what is known as "active set update" procedure. An example of a soft handover algorithm, as well as its execution, is shown in Chapter 5.1.4.2 and 5.1.4.3 of 3G TR 25.922, as well as Annex C thereof, which shows a flowchart of a soft handover algorithm.

3GPP TS 25.303 v.4.0.0 (2001-03) shows radio link addition for FDD in Chapter 6.4.4 thereof. As suggested above, radio link addition is triggered in the network RRC layer by measurement reports sent by the UE. The network RRC first configures the new radio link on the physical layer. Transmission and reception begin immediately. The network RRC then sends an RRC active set update message to the UE RRC. The UE RRC configures Layer 1 to begin reception. After confirmation from the physical layer in UE, an active set update complete message is sent to the RNC-RRC.

It has been agreed within the 3GPP to add a shared channel, i.e., the so-called High Speed Downlink Packet Access (HSDPA) concept to the UMTS (Universal Mobile Telecommunications System) Terrestrial Radio Access Network (UTRAN) architecture, see 3GPP TS 25.308 v6.3.0 (2004-12). The basic idea behind the HSDPA is to offer a shared high speed downlink (transport) channel (called HS-DSCH, for high-speed downlink shared channel) for use in communicating packet data to a UE (user equipment) device. As with the current DSCH, every UE device to which data can be transmitted on the HS-DSCH has an associated dedicated physical channel (DPCH). The DPCH is used to carry power control commands for the associated uplink, and if needed, other services, such as circuit-switched voice. The HS-DSCH offers a higher data rate and a fast retransmission mechanism, namely the HARQ (Hybrid Automatic Repeat Request) mechanism, provided by Node B. In pre-release 5 implementations, the only official shared channel in 3GPP in downlink was DSCH for which retransmission was to be always provided by the RLC (Radio Link Control) in the RNC (Radio Network Controller) of UTRAN, which was a relatively slow retransmission mechanism. However, since Release 5, DSCH has been deleted from the specifications due to lack of a need therefor. A similar dedicated channel (E-DCH) has been agreed for High Speed Uplink Packet Access (HSUPA). Thus, a similar enhancement is contemplated for the uplink as set forth in 3GPP TS 25.309 v6.3.0 (2005-06) "FDD Enhanced Uplink; Overall description; Stage 2 (Release 6)." HS-DSCH mobility procedures and E-DCH Specific Scenarios are outlined in sections 7.10 and 7.20, respectively, of 3GPP: "Technical Specification Group RAN; TR 25.931 v6.2.0 (2005-06); UTRAN functions, examples on signaling procedures (Release 6)." Details of an "Active Set Update (ASU) with the HS-DSCH" has been described in co-pending U.S. provisional application Ser. No. 60/614,562 filed Sep. 29, 2004 (now U.S. patent application Ser. No. 11/237,643 which is incorporated by reference for background.

RAN2 has discussed in the contribution R2-042103 (in RAN2#44) about the enhancement to Serving HS-DSCH cell change when there is a simultaneous need to update the Active Set. RAN2 has then discussed the proposal to include the enhancement into the RAN2 RRC specification in contribution R2-050115 (in RAN2#45bis), and then agreed the CR to RRC specification in contribution R2-051203 (in RAN2#46bis).

The purpose of the Enhancement is that when the need for Active Set Update (ASU) and HS-DSCH cell change occurs simultaneously, the SRNC can avoid executing two separate procedures; Active Set Update and e.g. Physical Channel Reconfiguration to the UE. This might lead to a service break, which will happen because of the parallel procedure principle, which prohibits the simultaneous parallel procedures.

RAN2 has agreed the importance of the enhancement, and agreed to include the HS-DSCH Serving Cell change functionality into the RRC: Active Set Update procedure. This will therefore lead to faster ASU and HS-DSCH Cell change, which means a smaller transmission break or a break can be fully avoided.

For serving cell change and branch addition/deletion, three RNSAP/NBAP procedures (RL Addition/Deletion, Synchronised Radio Link Reconfiguration and Radio Link Reconfiguration Commit) must be executed according to the current specifications.

BRIEF SUMMARY OF THE INVENTION

According to a first aspect of the present invention, data is stored on a computer-readable medium, said data is for transfer in radio link addition messages and radio link deletion messages of a mobility procedure in a wireless telecommunications system, each message for transferring said data in a data structure according to a standard, wherein each radio link addition message and each radio link deletion message comprises a request including an information element including a radio link identification and an information element including high speed downlink shared channel serving cell change information. The request may optionally include an information element identifying a connection frame number comprising a high-speed data packet access connection frame number and the radio link identification is of a high speed physical downlink shared channel.

According to a second aspect of the present invention, a network element is provided, responsive to a measurement report message from user equipment, for providing said radio link addition message or said radio link deletion message with a data structure according to the first aspect of the invention to another network element of said wireless telecommunications system and for receiving a radio link addition response message or a radio link deletion response message with a successful or unsuccessful indication.

According to a third aspect of the present invention, user equipment is provided for providing a measurement report to a network element having information relating to neighboring cells and receiving from said network element an active set update message with the data structure according to the first aspect of the present invention optionally including said information element identifying said connection frame number wherein said information relating to said connection frame number is also sent from said network element to another network element in said radio link addition message or in said radio link deletion message.

According to a fourth aspect of the present invention, a network element is provided for communicating by radio with user equipment, responsive to said radio link addition message or to said radio link deletion message with the data structure according to the first aspect of the present invention comprising said request optionally including said information element identifying said connection frame number for providing a radio link addition response message or a radio link deletion response message to another network element which has sent said radio link addition message or said radio link deletion message.

According to a fifth aspect of the present invention, a system is provide comprising user equipment for providing a measurement report having information relating to neighboring cells of said system and for receiving an active set update message optionally including information relating to a connection frame number, a first network element, responsive to said measurement report for providing said active set update message to said user equipment and for providing a radio link addition request message or for providing a radio link deletion request message optionally including said information relating to said connection frame number, and a second network element, responsive to said radio link addition request message or to said radio link deletion request message, for respectively providing a radio link addition response message or a radio link deletion response message to said first network element. The first network element may also be responsive to said radio link addition response message or to said radio link deletion response message for providing said active set update message.

According to a sixth aspect of the present invention, a method is provided for execution in user equipment, comprising providing a measurement report to a network element having information relating to neighboring cells, and receiving from said network element an active set update message optionally including information relating to a connection frame number wherein said information relating to said connection frame number is also optionally sent from said network element to another network element in a radio link addition message or in a radio link deletion message and wherein said another network element is for communicating by radio with said user equipment.

According to a seventh aspect of the present invention, a method is provided for execution in a network element, comprising receiving a measurement report message from user equipment, and providing a radio link addition message as a request message to another network element, wherein a connection frame number is optionally included as an information element in said radio link addition message or said radio link deletion message.

According to an eighth aspect of the present invention, a method is provided for execution in a network element, comprising receiving a radio link addition message or a radio link deletion message from another network element having an optional information element identifying a connection frame number, and providing a radio link addition response message or a radio link deletion response message to said another network element.

According to a ninth aspect of the present invention, a method is provided comprising sending a measurement report from user equipment having information relating to neighboring cells to a serving radio network controller, providing a radio link addition request message having an optional information element identifying a connection frame number from said serving radio network controller to a base station in response to said measurement report message, sending a radio link addition response message from said base station to said serving radio network controller in response to said radio link addition request message, and sending an active set update message with said optional information element identifying said connection frame number from said serving radio network controller to said user equipment in response to said radio link addition response message.

According to a tenth aspect of the present invention, a method is provided comprising receiving in a serving radio network controller a measurement report message having information relating to neighboring cells from user equipment, sending an active set update message with an optional connection frame number information element from said serving radio network controller to said user equipment, sending from said serving radio network controller to a base station for communicating by radio with said user equipment a radio link deletion request message with said optional connection frame number information element, and sending from said base station to said serving radio network controller a radio link deletion response message whereafter data is sent from said serving radio network controller to said user equipment via said base station.

According to an eleventh aspect of the present invention, a computer program is embodied in a computer readable medium for processing radio link addition messages and radio link deletion messages relating to a mobility procedure in a wireless telecommunication system, each message comprising a request including an information element including a radio link identification and an information element including high speed downlink shared channel serving cell change information. The request may optionally include an information element identifying a connection frame number comprising a high-speed data packet access connection frame number and said radio link identification is of a high speed physical downlink shared channel.

According to a twelfth aspect of the present invention, an integrated circuit is provided for processing radio link addition messages and radio link deletion messages relating to a mobility procedure in a wireless telecommunication system, each message comprising a request including an information element including a radio link identification and an information element including high speed downlink shared channel serving cell change information. The request may optionally include an information element identifying a connection frame number comprising a high-speed data packet access connection frame number and said radio link identification is of a high speed physical downlink shared channel.

According to a thirteenth aspect of the present invention, apparatus is provided comprising a transmitter for providing a measurement report message to a network element having information relating to neighboring cells, and a receiver, responsive to an active set update message from said network element, said message optionally including information relating to a connection frame number wherein said information relating to said connection frame number is also optionally sent from said network element to another network element in a radio link addition message or in a radio link deletion message and wherein said another network element is for communicating by radio with said apparatus.

According to a fourteenth aspect of the present invention, apparatus is provided comprising a receiver, responsive to a measurement report message from user equipment and a transmitter for providing a radio link addition message as a request message to another apparatus, wherein a connection frame number is optionally included as an information element in said radio link addition message or said radio link deletion message.

According to a fifteenth aspect of the present invention, apparatus is provided comprising a receiver responsive to a radio link addition message or a radio link deletion message from another apparatus having an optional information element identifying a connection frame number, and a transmitter for providing a radio link addition response message or a radio link deletion response message to said another apparatus.

According to a sixteenth aspect of the present invention, a system is provided comprising user equipment for sending a message report having information relating to neighboring cells, a serving radio network controller, responsive to said measurement report from said user equipment, for providing a radio link addition request message having an optional information element identifying a connection frame number, a base station, responsive to said radio link addition request message, for sending a radio link addition response message to said serving radio network controller wherein, in response to receipt of said radio link addition response message from said base station, said serving radio network controller sends an active set update message with said optional information element identifying said connection frame number to said user equipment for use by said user equipment in selecting a proper frame number to begin receiving information from an added radio link.

According to a seventeenth aspect of the present invention, a system is provided comprising a serving radio network controller, responsive to a measurement report message having information relating to neighboring cells, for sending an active set update message with an optional connection frame number information element to said user equipment, and for sending a radio link deletion request message with said optional connection frame number information element, and a base station, responsive to said radio link deletion request message with said optional connection frame number information element, for sending to said serving radio network controller a radio link deletion response message whereafter data is sendable from said serving radio network controller to said user equipment via said base station using said optional connection frame number information element.

According to an eighteenth aspect of the present invention, apparatus is provided comprising means for receiving a measurement report message from user equipment, and means for providing a radio link addition message as a request message to another apparatus, wherein a connection frame number is optionally included as an information element in said radio link addition message or said radio link deletion message. The apparatus according to the eighteenth aspect of the invention may further comprise means responsive to a radio link addition response message from said other apparatus for providing an active set update message to user equipment including said connection frame number as an information element of said active set update message. The user equipment may be able to receive data from a new cell using said connection frame number.

The present invention makes it possible to take into account in the Radio Network Subsystem signalling that the Active Set Update and HS-DSCH/E-DCH Serving cell change can occur simultaneously, which means that enhancements can be made also into the NBAP (3GPP TS 25.433 V6.6.0 (2005-06) "UTRAN Iub interface Node B Application Part (NBAP) signalling") and RNSAP (3GPP TS 25.423 V6.6.0 (2005-06) "UTRAN Iur interface RNSAP signalling") specifications.

The RL Addition and RL Deletion procedures may therefore be updated so that the NBAP and RNSAP will be aligned to RRC and these enhancements will promote even faster Active Set Update with HS-DSCH/E-DCH Serving Cell change.

The present invention presents the needed enhancements and proposes that NBAP and RNSAP are aligned into RRC specification and therefore the simultaneous Active Set Update and HS-DSCH/E-DCH Serving Cell change can occur even faster.

The field of the invention may thus be related in a non-limiting way to mobility for high speed downlink packet access (HSDPA) and high speed uplink packet access (HSUPA) and the fact that HS-DSCH/E-DCH Serving Cell Change is currently possible only with RL Reconfiguration procedure in Iub/Iur.

The HS-DSCH Serving cell change can be categorized into two different cases: Intra-Node B HS-DSCH Serving cell change and Inter-Node B HS-DSCH Serving cell change, which are defined in following way (note: other possible scenarios are Intra/Inter DRNS HS-DSCH Serving Cell changes but are not presented separately because same kind of analogy applies with the Intra/Inter Node B HS-DSCH Serving cell Change).

Intra-Node B HS-DSCH Serving Cell Change:

When the old HS-DSCH Serving cell and new HS-DSCH Serving cell are in the same Node B, then the Serving cell change can be called as Intra-Node B HS-DSCH Serving cell change. In this case there is no need to deliver the HSDPA information to the Node B and there is no need to establish the new transport bearer to Node B either.

Inter-Node B HS-DSCH Serving Cell Change:

When the old HS-DSCH Serving cell and new HS-DSCH Serving cell are in the different Node B, then the Serving cell change can be called as Inter-Node B HS-DSCH Serving cell change. In this case the new Node B doesn't have HSDPA information and that has to be delivered. Also there is no transport bearer existing yet in the new Node B and therefore it has to be established.

Current Status for HSDPA mobility at 3GPP RAN3 for Intra-Node B HS-DSCH Serving cell change and Inter-Node B HS-DSCH Serving cell cases:

RL Addition Procedure:

It has been agreed that RL Addition was not used for serving cell change from the beginning of 2002.

It seems it was agreed based on the following arguments. (from chapter 2.3 in R3-020187: HS-DSCH mobility procedures).

One- vs. Two-Step Procedures

When a radio link is added to the active set it can be regarded as unlikely that the added cell immediately also becomes the one best suited for HS-DSCH service. Therefore, a setup of a new radio link combined with a direct change of the serving HS-DSCH cell to this new link is probably not needed. In section 3.4 an example of a two-step procedure is outlined, which is comprised of a radio link addition in the first step, and serving HS-DSCH cell change in the second step. A direct setup of the HS-DSCH at radio link addition could be added only if justified by clear performance gains.

The question arises whether this principle of using a two-step procedure is also adequate in case of a hard handover (e.g. inter-frequency handover). An example is given in section 3.3 of hard handover for a UE with HS-DSCH assignment. In this case it suffices to apply a two-step procedure in the NBAP/RNSAP signalling only, where in the first step the new radio link is setup the target Node B and in the second step the synchronised serving HS-DSCH cell change is prepared. This example is applicable with the existing NBAP/RNSAP procedures. Optimisation of the NBAP/RNSAP signalling should be considered.

On the radio interface, however, the hard handover can be handled with only a single RRC procedure. This example should be applicable in Release 99 already when hard handover is performed for a UE with DSCH assignment.

Although the reasoning above says that the new HS-DSCH serving cell change is the same cell that is going to be added, the proposal in this invention is to enable also other existing cells in Node B to become new HS-DSCH serving cell.

Also with RL Setup, we can establish eg. 2*RL and RNC has to choose which one is the best one for the HS-DSCH serving cell and same kind of mechanism can also be applied to RL Addition, especially for intra Node B hard HO which is done with the RL Addition.

Thus, based on the above reasoning and reasons described in chapter 2, (and regardless of the earlier decision in 3GPP) the RL Addition is also proposed to be enhanced to include HS-DSCH serving cell information.

For the Inter-Node B HS-DSCH Serving Cell Change Case:

The RL Addition is also proposed to be enhanced to include HS-DSCH Information IE. This addition enables the Inter-Node B HS-DSCH Serving Cell change in a case where new HS-DSCH Serving Cell is in another Node B, which already has one existing RL. Currently the HS-DSCH Serving Cell change with simultaneous RL Addition, has to be done with separate RL Addition and RL Reconfiguration procedures.

RL Deletion Procedure:

There has been no discussion on using the RL Deletion for serving cell change

At 3GPP TSG RAN#28 meeting, RRC (TS25.331) CR No 2564 (title: Including HS-DSCH serving cell change in ASU) has been approved (the CR in RP-050320). The proposal in the CR enhances performance for HSDPA mobility by making what serving cell change is executed with Active Set Update procedure possible.

Note: The same argument could be applied for E-DCH serving cell change which it is not possible to execute the HSUPA serving cell change by RL addition and deletion procedure.

For the Inter-Node B HS-DSCH Serving Cell change case, the RL Deletion is also proposed to be enhanced to include HS-DSCH Information IE. This addition enables the Inter-Node B HS-DSCH Serving Cell change in a case where new HS-DSCH Serving Cell is in another Node B, which contains at least one RL, which needs to be deleted. Currently the HS-DSCH Serving Cell change with simultaneous RL Deletion, has to be done with separate RL Deletion and RL Reconfiguration procedures.

As mentioned previously, for serving cell change and branch addition/deletion, three RNSAP/NBAP procedures (RL Addition/Deletion, Synchronised Radio Link Reconfiguration and Radio Link Reconfiguration Commit) must be executed in the current specifications.

This invention proposes an Iub/Iur (NBAP/RNSAP) signalling solution for RL Addition procedure to be combined with HS-DSCH and E-DCH Serving Cell Change, and further according to the present invention RL Deletion may be combined with HS-DSCH/E-DCH Serving Cell Change when the need to execute the HS-DSCH/E-DCH Serving Cell Change, and one of the above two procedures occurs at the same time in the RNC.

By combining the HS-DSCH/E-DCH Serving Cell Change with the RL Addition and RL Deletion procedures, RNC avoids using the Synchronised(Unsynchronised) Radio Link Reconfiguration and Commit procedure and thus signalling solution is more efficient in the Iub/Iur interfaces.

This invention is usable also for E-DCH serving Cell Change with RL Addition also enables E-DCH Setup with/ without serving cell change in Node B/DRNS.

BRIEF DESCRIPTION OF THE DRAWINGS

FIG. 9 shows an embodiment of a signal processor usable in the SRNC, Node B, or UE of FIG. 5.

FIG. 10 shows a procedure for execution in user equipment.

FIG. 11 shows a procedure for execution in a network element such as Node B shown in FIGS. 3-5.

DETAILED DESCRIPTION OF INVENTION

Although specifically disclosed for 3GPP and HSDPA/HSUPA, it should be realized the invention is not limited to the HSDPA/HSUPA or the 3GPP and is generally applicable to all wireless communications.

According to the present invention, RL Addition and RL Deletion procedures or their functional equivalents can be optimized in Rel-6 to take into account that simultaneous need for Active Set Update and HS-DSCH/E-DCH Serving Cell change can occur. Therefore a description follows on how to update the Radio Link Management procedures, RL Addition and RL Deletion procedures.

Figure 1:
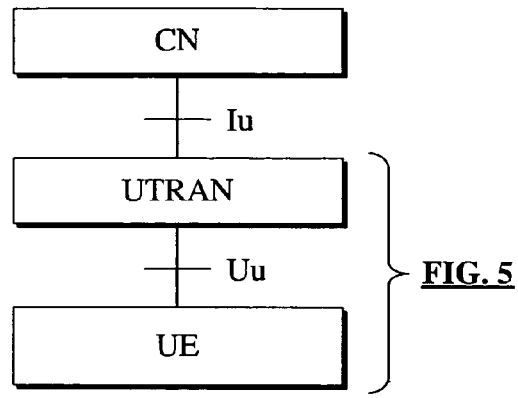
FIG. 1 shows the Universal Mobile Telecommunications System (UMTS) packet network architecture including the major architectural elements of user equipment (UE), UMTS Terrestrial Radio Access Network (UTRAN), and core network (CN).
Figure 2:
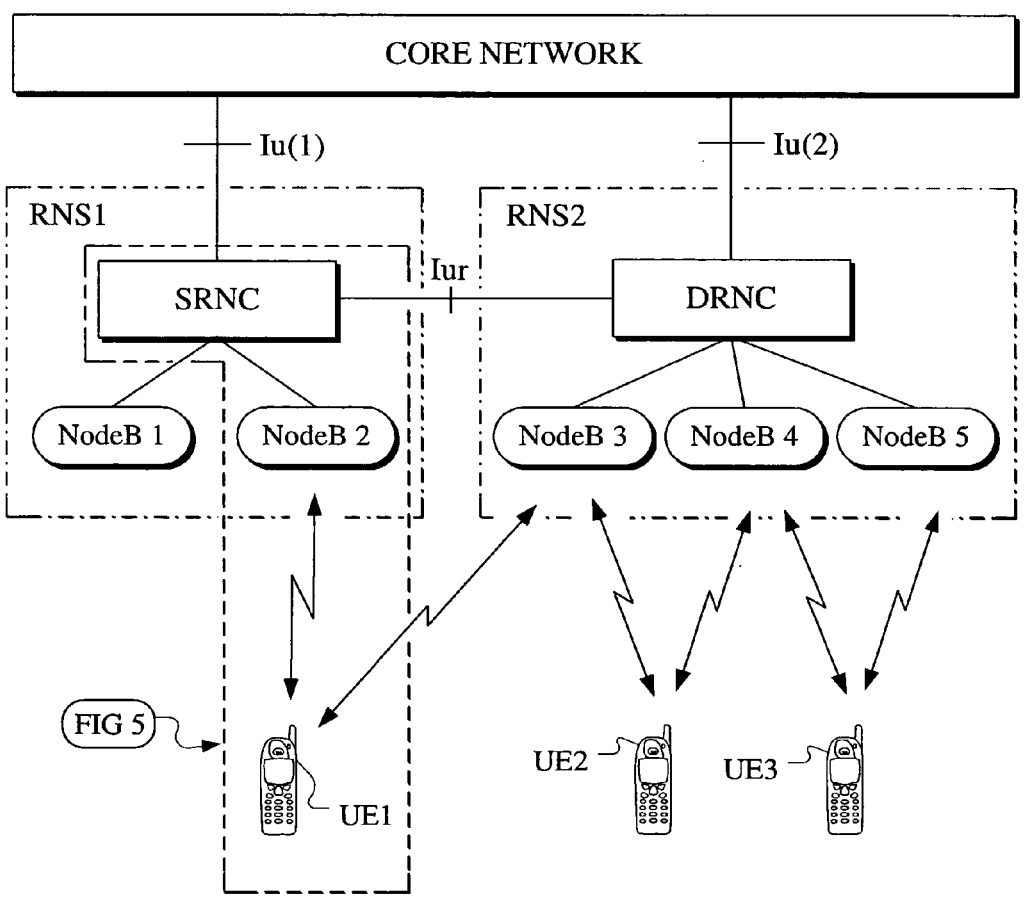
FIG. 2 shows some further details of the architecture of FIG. 1, particularly the UTRAN.
Figure 3:
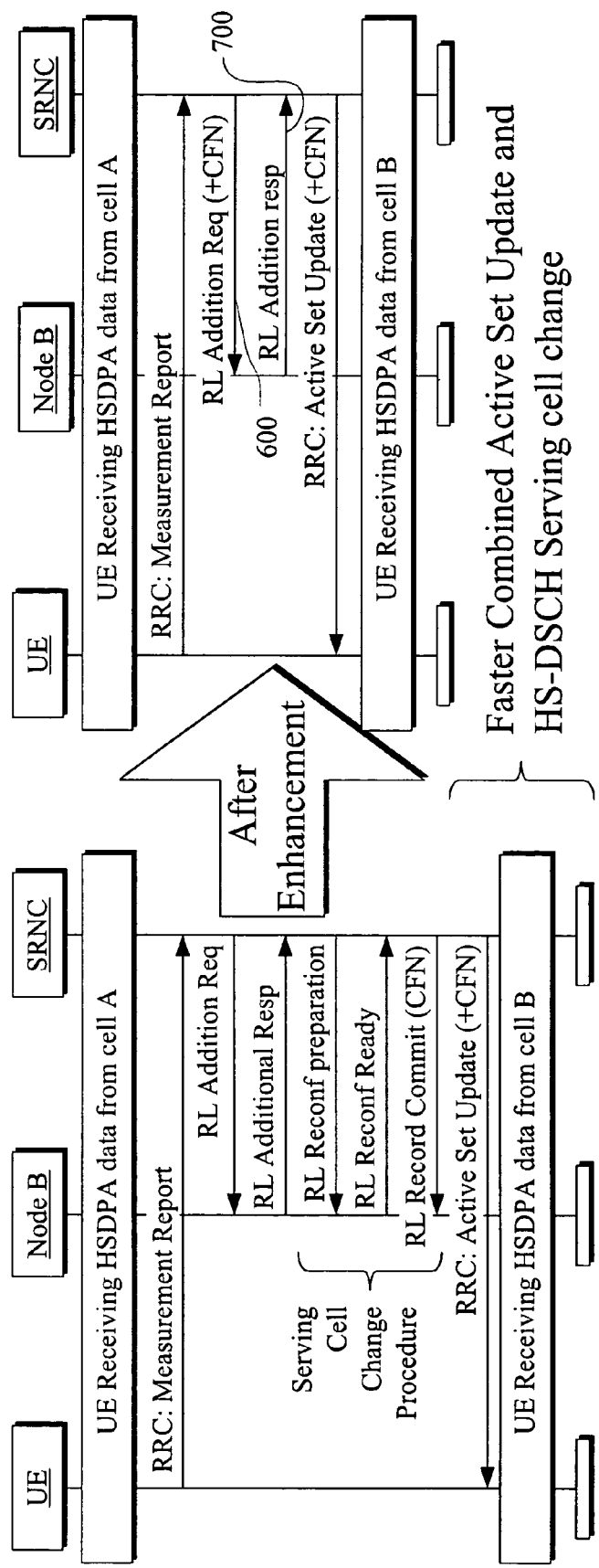
FIG. 3 shows both the current procedure and an enhanced procedure according to the invention to support HSDPA Serving Cell change and RL Addition.
Figure 4:
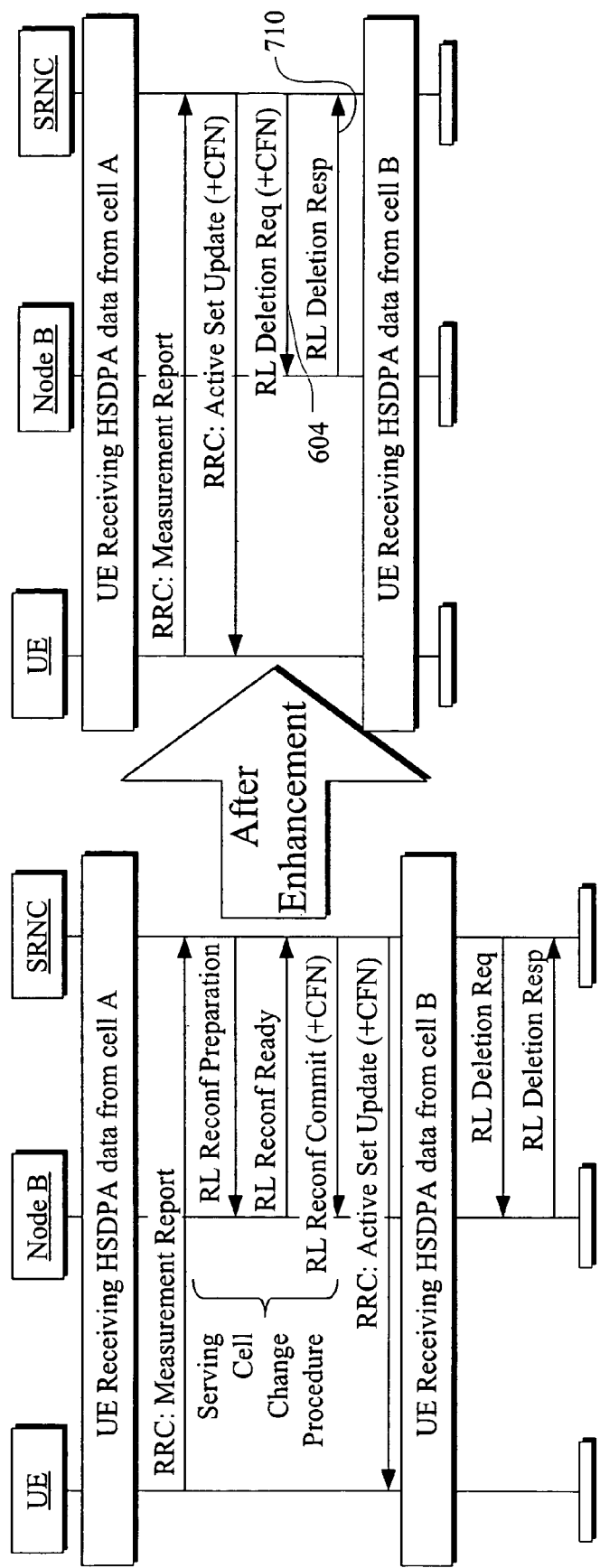
FIG. 4 shows both the current procedure and an enhanced procedure, according to the present invention, to support HSDPA Serving Cell change and RL Deletion

FIGS. 3 and 4 show the current procedures on the left hand side and the proposed enhancement on the right hand side, clearly illustrating the time saving achieved by the present invention.

RL Addition (see FIG. 3):

The problem is that when RL Deletion or RL Addition criteria triggers in RNC at the same time with the HS-DSCH/E-DCH serving cell change, RNC cannot carry out the HS-DSCH/E-DCH serving cell change at the same time as one of the above mentioned two RL Addition or RL Deletion procedures, but instead has to do HS-DSCH/E-DCH serving cell change with a separate RL Reconfiguration procedure with a different timing, i.e., not simultaneously or in parallel.

The parallel procedures rule prohibits executing the RL Addition and RL Reconfiguration procedures simultaneously and this decreases the performance. The RL Deletion procedure can be triggered at any time, but once the RL Deletion is triggered, the RNC has to wait until it is completed and then is allowed to initiate the RL Reconfiguration.

Thus, as shown for example on the left hand side of FIG. 3, when a simultaneous need for RL Addition and HS-DSCH Serving Cell change occurs in a Rel-5 RAN, the SRNC has to execute two separate procedures in a manner similar to that compared to Rel-5 RRC. In Iub/Iur, the SRNC first initiates the RL Addition procedure to add one RL into the Node B, and immediately afterwards the RL Reconfiguration procedures (RL Reconfiguration Preparation and RL Reconfiguration Commit/Unsynch RL Reconfiguration) to execute the HS-DSCH Serving Cell change. The order of the procedures has to be what is mentioned above if the added RL will be the HS-DSCH Serving Cell; otherwise the RL Reconfiguration can be executed first. From the RRC signalling point of view, the order of the NBAP/RNSAP procedures doesn't count, as the end result, the RL is added and HS-DSCH Serving Cell is configured, is what is needed before SRNC can initiate the also shown RRC:Active Set Update. If RNC were to first initiate the Serving cell change with the RL Reconfiguration procedure, the Node B communication context is in the prepared reconfiguration state and no RL Addition procedure can be triggered. Thus the RL Addition procedure is delayed and the performance of the softer combining gain is decreased. Also from an NBAP specification point of view, the Node B can reject the RL Addition procedure until the reconfiguration CFN is elapsed and thus the gain can be decreased even more depending on the implementations.

If the RNC initiates the RL Addition first, the Serving cell change with the RL Reconfiguration procedure is delayed until RL Addition is completed.

For enhancing performance for HSDPA mobility and HSUPA mobility, according to the present invention, a signalling solution is proposed which makes serving cell change at the same time as branch addition/deletion possible. The solution requires the introduction of some Information Elements (IEs) into the RNSAP/NBAP RL ADDITION REQUEST/RESPONSE/FAILURE and RL DELETION REQUEST/RESPONSE messages such as shown in FIGS. 6A, 6B, 7A & 7B by way of example only. Such new IEs can be added to the functional message definitions and contents described in the Elements for NBAP communication in section 9.1 of 3GPP TS 25.433 v6.6.0 (2005-06) for instance for the subsections noted and in the manner shown in FIGS. 6A, 6B, 7A & 7B.

Figure 6A:
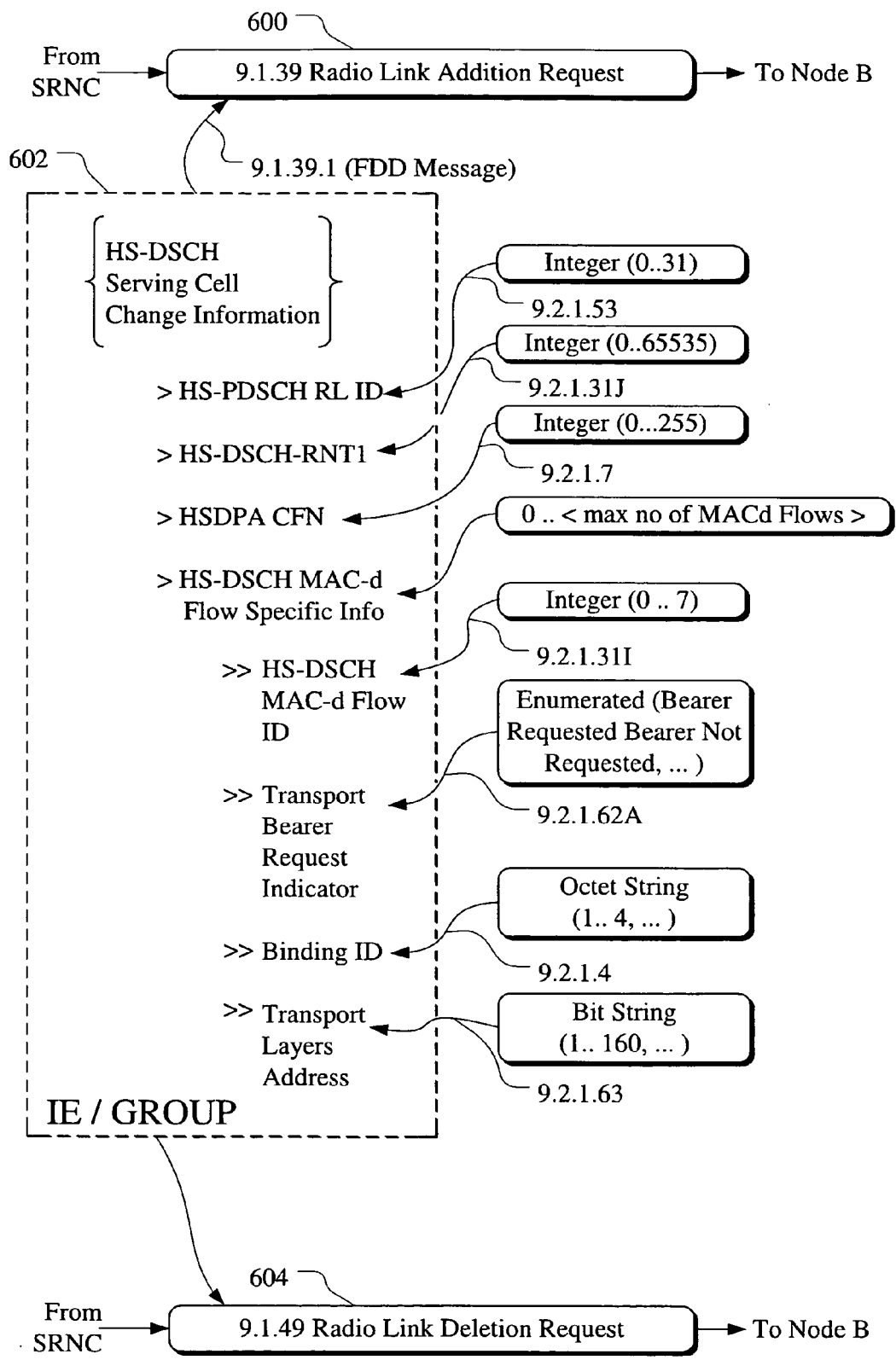
FIGS. 6A and 6B together show information elements useable in a radio link addition request message or in a radio link deletion request message with new information elements added, according to the present invention.
Figure 6B:
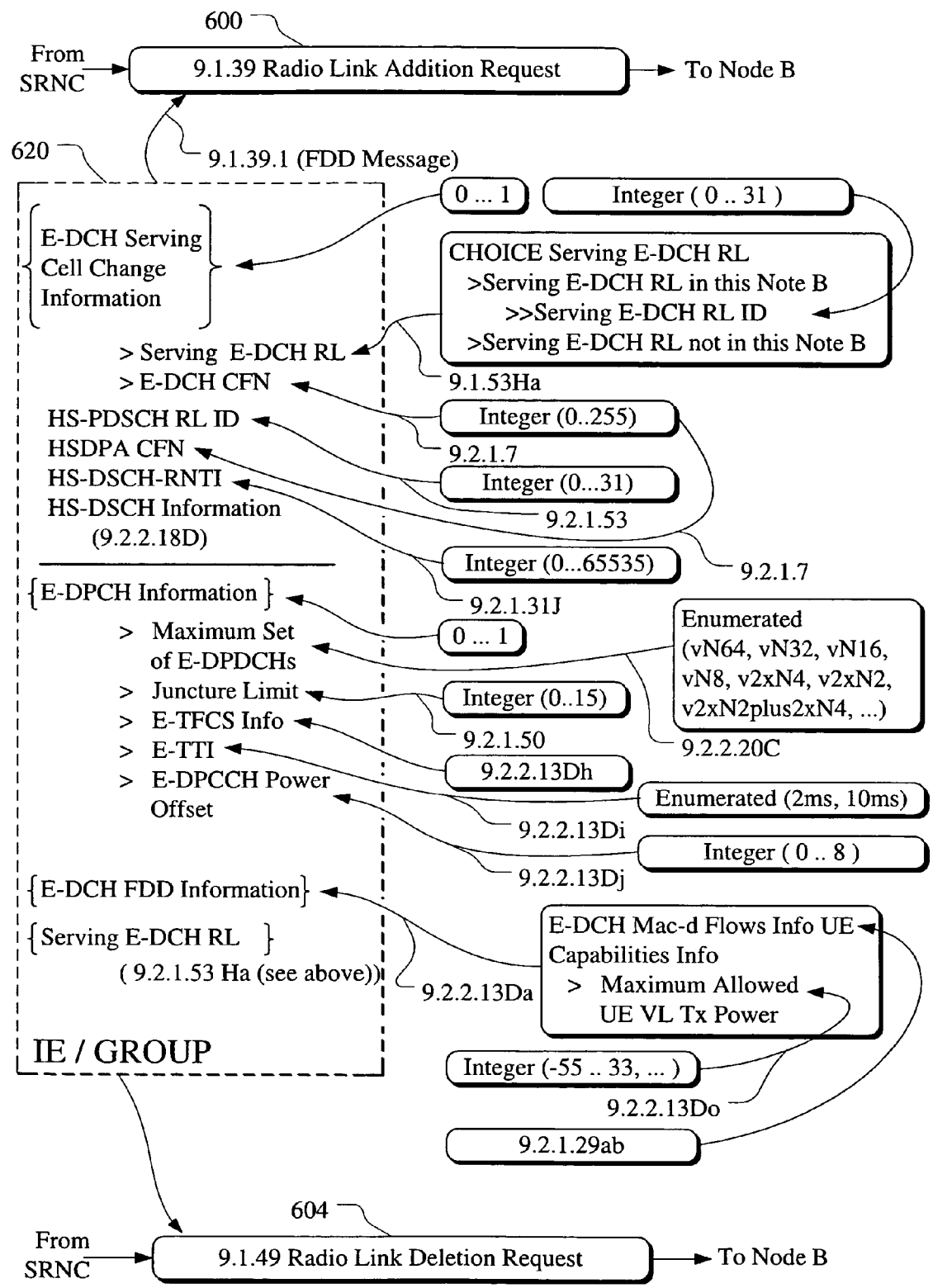

Referring to FIGS. 6A and 6B, for the RL Addition procedure with a serving cell change, a RADIO LINK ADDITION REQUEST message 600 may be augmented for instance as shown an information element grouping 602 containing one or more of the sub-information elements shown. Thus, to make provision for the case of an RL Addition procedure with HS-DSCH serving cell change the RL ADDITION REQUEST message 600 is changed to include one or more of:—HS-DSCH RL ID, The timing IE (an example for the IE name is HSDPA CFN) that Node B starts to forward HS-DSCH data over the newly added RL
HS-DSCH RNTI
Transport Bearer Requested Indicator IE, Transport Layer Address and Binding ID (per HS-DSCH MAC-d flow)
(Note: above all sub-IEs can for instance belong to the same IE grouping (an example for the IE group name is HS-DSCH Serving Cell Change Information as shown) which may be used for HS-DSCH Serving Cell change)
For the Inter-Node B HS-DSCH Serving Cell change case, also HS-DSCH Information IE, HS-DSCH RL ID, HS-DSCH RNTI and HSDPA CFN (Connection Frame Number).

The reason why the CFN is added as an IE into the RL ADDITION REQUEST 600 is due to the "MAC-hs reservation." If the message does not have this CFN timing IE, the Node B which supports MAC-hs reservation will start to send HS-DSCH data (which is in Node B's buffer) over the newly added RL as soon as the Node B replies with the RL ADDITION RESPONSE message, which is before the SRNC executes the Active Set Update procedure with the UE. Hence, the UE cannot receive any data from the newly added RL even if the Node B sends the data, i.e. packet loss over the air interface will be generated. The problem must be avoided. By means of the CFN, the SRNC can synchronize the timing used by the Node B to start sending HS-DSCH data over newly added RL with the timing that UE uses when starting to receive data over the RL. It should be noted that the added RL is configured as soon as the Node B replies with the RL ADDITION RESPONSE message 700 (see FIGS. 7A & 7B), which is same behaviour as in the current specification.

Figure 7A:
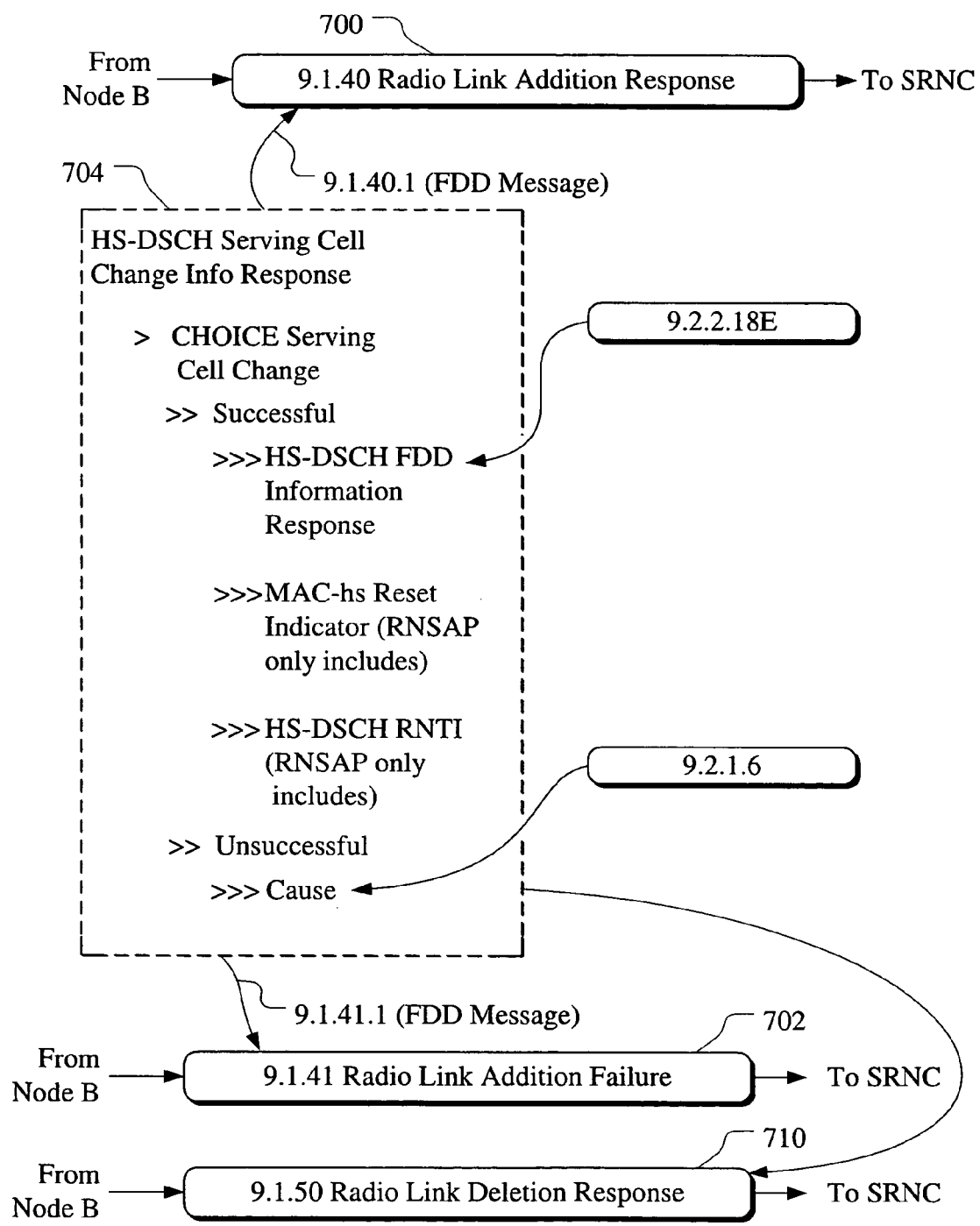
FIGS. 7A and 7B together show information elements useable in a radio link addition response message, a radio link addition failure message, or a radio link deletion response message with new information elements added, according to the present invention.
Figure 7B:
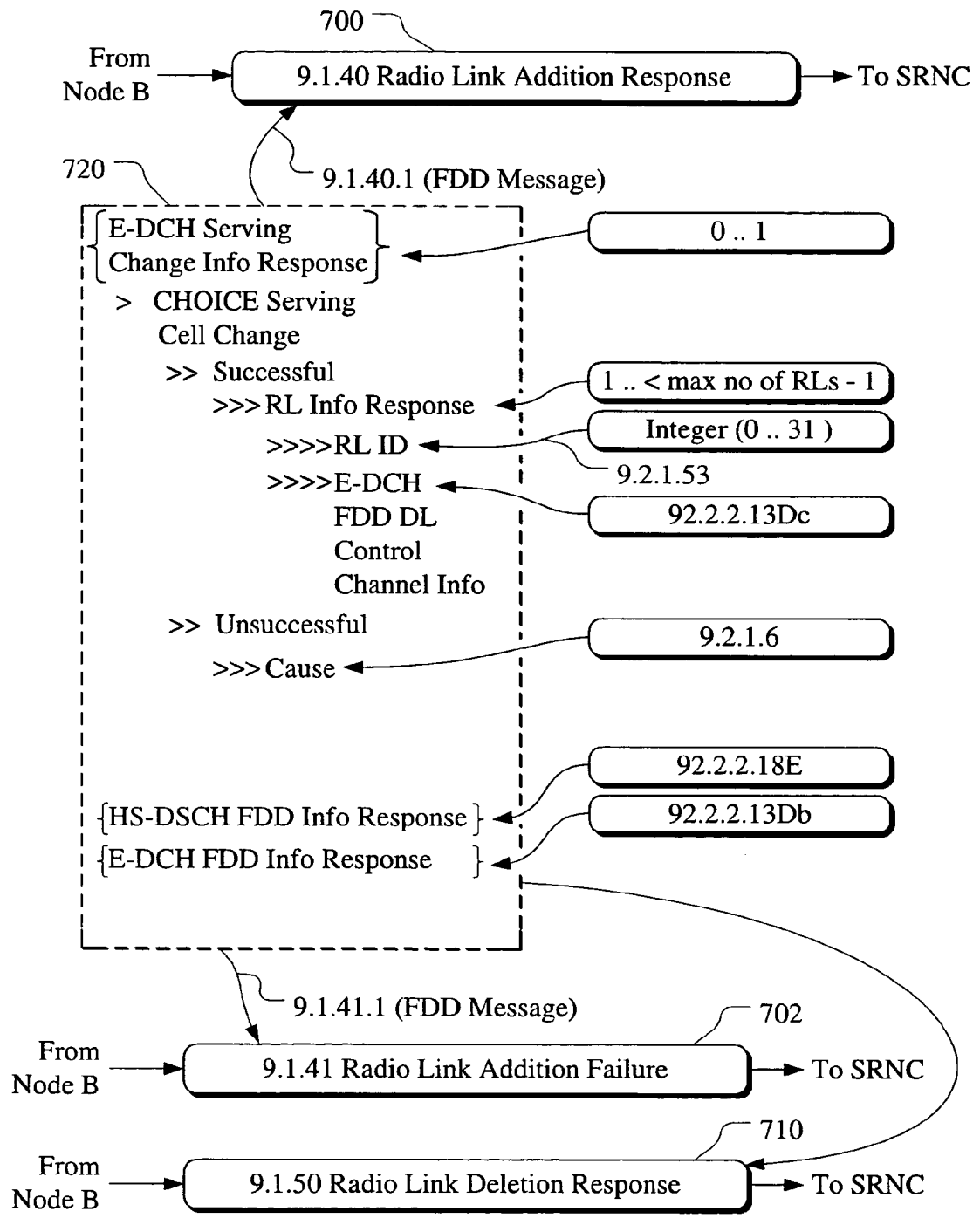

In the RL ADDITION RESPONSE message as shown in FIGS. 7A and 7B and RL ADDITION FAILURE message 702, an IE (Serving Cell Change Indicator) may be added to indicate if the required serving cell change was successful/unsuccessful. An HS-DSCH Information Response IE 704 may be added to carry the Transport Layer Address, etc. A MAC-hs reset indicator sub-IE and HS-DSCH RNTI sub-IE may also be added, which IEs are applicable in RNSAP only, and which do not exist in NBAP. These three IEs are set when the above IE (Serving Cell Change Indicator) 704 notifies "successful". A "cause" IE may be added in the message when the above IE (Serving Cell Change Indicator) notifies "unsuccessful" in order to give a cause indication for the lack of success. For an Inter-Node B HS-DSCH Serving Cell change case, also HS-DSCH Information may be included.

As has been explained above in the enhancement according to the present invention for Rel-6, the SRNC can initiate the RL Addition procedure, which contains the CFN (Connection Frame Number) when the new HS-DSCH Serving Cell change activates (CFN indicates when the new HS-DSCH Serving Cell becomes the serving cell). When the RL Addition and the new HS-DSCH Serving Cell change are configured into the Node B, the SRNC doesn't have to initiate the RL Reconfiguration (Serving cell change) procedure and instead can immediately initiate the RRC:Active Set Update and therefore time savings are gained as illustrated on the right hand side of FIG. 3 (as compared to the left hand side).

RL Addition procedure with E-DCH serving cell change (FIG. 6B)
RL ADDITION REQUEST message 600 includes
Serving E-DCH RL
The timing IE (e.g., IE name is E-DCH CFN) that the Node B starts to forward E-AGCH data over new serving E-DCH RL
(note: the above two IEs may belong to the same IE (an example for the IE name is E-DCH Serving Cell Change Information) which may be used for E-DCH Serving Cell change)
For Intra/Inter-Node B E-DCH Serving cell change with E-DCH Setup (i.e. E-DCH is not configured in the Node B), also E-DCH FDD Information IE and E-DPCH Information IE (note: This also allows E-DCH Setup without serving cell change by RL addition Procedure.)
RL ADDITION RESPONSE message 700 and RL ADDITION FAILURE message 702
One IE which indicates if the required E-DCH serving cell change was successful/unsuccessful and when the indicator notifies "successful", E-DCH FDD DL Control Channel Information for new serving RL and old serving RL may be included. And when the indicator notifies "unsuccessful", a Cause IE may be included.
For Intra/Inter-Node B E-DCH Serving cell change with E-DCH Setup, also there may be an E-DCH FDD Information Response IE provided.

RL Deletion (see FIG. 4):
The enhancement into the RL Deletion procedure is similar to the above described enhancement to the RL Addition procedure and the enhancement is illustrated in the FIG. 4 with the prior art procedure on the left and the inventive enhancement on the right.

In the Rel-5 RAN, the SRNC initiates the RL Reconfiguration (Unsynchronized) procedure first as shown on the left if the current HS-DSCH Serving Cell is the one which has the RL which is going to be deleted. Then after the RL Reconfiguration procedure, the HS-DSCH Serving Cell is changed and the SRNC can initiate the RL Deletion procedure.

If the RL to be deleted is not in the cell, which is not the current HS-DSCH Serving Cell, the SRNC can initiate the procedures in the other order as well. In that case also the Synchronized RL Reconfiguration procedure can be used.

The reason for not using Synchronized RL Reconfiguration in the first case (the RL to be deleted is in the same cell with HS-DSCH Serving Cell) is that the cell to be deleted, is deleted immediately, and when the HS-DSCH Serving Cell change is done afterwards with the CFN, there will be a logical error in Node B as the HS-DSCH Serving Cell remains in the cell which doesn't have a RL.

In Rel-5, it is also possible to initiate RL Deletion immediately after the Synchronized/Un-Synchronized RL Reconfiguration procedure as the RL Deletion procedure can be initiated at any time and is not restricted by the parallel procedure rule. Even though the initiation is possible at any time, from a Node B point of view, one procedure instead of two parallel procedures is easier to handle. Therefore the RL Deletion procedure is proposed to be enhanced.

For serving cell change and branch addition/deletion, three RNSAP/NBAP procedures (RL Addition/Deletion, Synchronized Radio Link Reconfiguration and Radio Link Reconfiguration Commit) must be executed in current specifications.

In a manner similar to that described above for the RL Addition of FIG. 3, the RL Deletion procedure with serving cell change will be described for both HS-DSCH and E-DCH.

For the RL Deletion procedure with an HS-DSCH serving cell change, the RL DELETION REQUEST message 604 is augmented (see FIGS. 6A and 6B) to include an HS-DSCH RL ID which is indicative of the identity of the HS-DSCH RL and a timing IE (e.g. with an IE named HSDPA CFN) that Node B uses to start forwarding HS-DSCH data. The timing IE is set only when the RL to be deleted is different compared to current serving HS-DSCH RL. It may also be augmented by an HS-DSCH RNTI. A Transport Bearer Requested Indicator IE, Transport Layer Address and Binding ID (per HS-DSCH MAC-d flow) may be added. The above IEs may belong to the same IE grouping (an example for the IE name is HS-DSCH Serving Cell Change Information) which is used for HS-DSCH Serving Cell change). For the Inter-Node B HS-DSCH Serving Cell change case, an HS-DSCH Information IE, HS-DSCH RL ID, HS-DSCH RNTI and HSDPA CFN may be added.

For the RL DELETION RESPONSE message 710 shown in FIGS. 7A & 7B, an IE grouping 704 notifies if the required serving cell change was successful/unsuccessful. The HS-DSCH Information Response IE grouping 704 may be carry the Transport Layer Address, etc. A MAC-hs reset indicator IE and HS-DSCH RNTI IE may be added which are applicable in RNSAP only, since they do not exist in NBAP. These three IE are set when above IE group 704 notifies "successful". A Cause IE (9.2.1.6) may be added in the messages when the above IE group 704 (Serving Cell Change Indicator) notifies "unsuccessful". For the Inter-Node B HS-DSCH Serving Cell change case, also an HS-DSCH FDD Information Response IE may be added.

For the RL Deletion procedure with a E-DCH serving cell change, the RL DELETION REQUEST message 604 (FIGS. 7A & 7B) includes a Serving E-DCH RL IE and a timing sub-IE (e.g. E-DCH CFN) that the Node B Starts to forward E-AGCH data over a new serving E-DCH RL. These two IEs may belong to the same IE 602 (an example for the IE name is E-DCH Serving Cell Change Information) which is used for E-DCH Serving Cell change). For Intra/Inter-Node B E-DCH Serving cell change with E-DCH Setup (i.e. E-DCH is not configured in the Node B), also an E-DCH FDD Information IE 620 and an E-DPCH Information IE may be added (note: this also allows E-DCH Setup without serving cell change by RL addition Procedure). The RL DELETION RESPONSE message 710 (FIG. 7B) may include an IE 720 to indicate if the required E-DCH serving cell change was successful/unsuccessful. And the indicator notifies "successful", E-DCH FDD DL Control Channel Information IE for both the new serving RL and the old serving RL may be included when the indicator notifies "unsuccessful", a Cause IE may be included as shown in FIG. 7B. For Intra/Inter-Node B E-DCH Serving cell change with E-DCH Setup, also an E-DCH FDD Information Response IE may be included.

Figure 5:
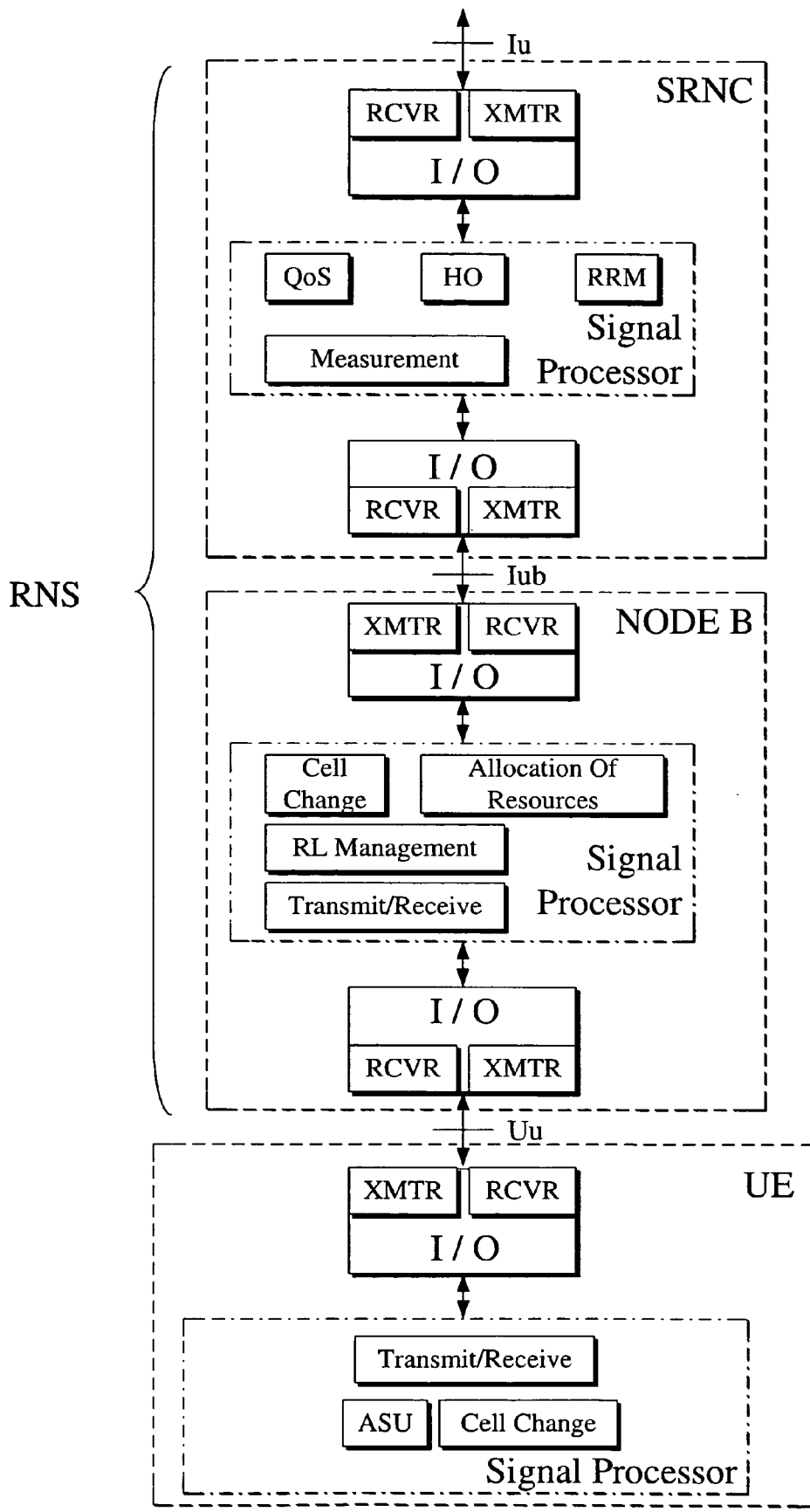
FIG. 5 shows a Radio Network Subsystem (RNS) comprising an SRNC in communication with a Node B which is in turn in communication with user equipment over a radio interface.

FIG. 5 shows an RNS comprising an SRNC connected to a CN (not shown) by a Iu interface and to a Node B by an Iub interface. The Node B is in turn connected to a UE by a Uu interface. The SRNC is shown having a first input/output interface connected to the Iu interface and a second input/output interface connected to the Iub interface. A signal processor within the SRNC is connected to both the first and the second input/output interfaces of the SRNC. Likewise, the Node B is shown with a first input/output interface connected to the Iub interface and a second input/output interface connected to the Uu interface. A signal processor within the Node B is connected to both the first and the second input/output interfaces of the Node B. The UE is shown having an input/output interface connected to the Uu interface and to a signal processor within the UE.

The signal processor of the SRNC controls the QoS of the UE. A handover (HO) control function of the signal processor receives the neighboring cell measurements from the UE and detects a need to trigger Iub/Iur Radio Link management procedures (RL Setup, RL Addition, RL Delete, RL Reconfiguration) based on the Radio Resource Management (RRM) rules. The signal processor of the SRNC is also in charge of deciding the HS-DSCH/E-DCH Serving Cell and when it needs to be changed. It can decide to do HS-DSCH/E-DCH Serving Cell change in a synchronized or in an unsynchronized manner.

The signal processor of the Node B is in charge of transmitting/receiving HSDPA/E-DCH data onto/from the radio interface. It also allocates HSDPA/E-DCH resources to the UE. It receives HSDPA data from the Iub and is in charge of scheduling the HSDPA data into the radio interface. It processes the HS-DSCH Serving Cell change when it is ordered to do so by the SRNC. It performs similar E-DCH procedures. It processes the RL Management procedures when ordered to do so by the SRNC.

The signal processor of the UE measures parameters relating to the neighboring cells and sends measurement report messages to its SRNC. It receives and processes the Active Set Update (ASU) messages when ordered to do so by the SRNC. It receives and processes the HS-DSCH/E-DCH Serving Cell change when ordered to do so by the SRNC.

The signal processors within the UE and the SRNC follow the RRC procedures described in 3GPP TS 25.331 v6.6.0 (2005-06) "Technical Specification Group Radio Access Network; Radio Resource Control (RRC); Protocol Specification (Release 6)." An overview of RRC States and State Transitions is shown in Clause 7 ("Protocol States") thereof and describes the performance of the measurement process according to the measurement control information as specified in subclauses 8.4 (Measurement Procedures) and 14.4 (Traffic Volume Measurements). According thereto, the signal processor of the UE of FIG. 5 prepares the RRC Measurement Report of FIGS. 3 and 4 and sends it via its input/output device over the Uu interface to the Node B and from there it is sent by the Node B over the Iub interface to the SRNC. The measurement report itself is described in Clause 8.4.2 of TS 25.331 which specifies it is transmitted on the uplink DCCH when the reporting criteria stored in the variable MEASUREMENT_IDENTITY are met for any ongoing traffic measurement or UE positioning measurement that is being performed in the UE. The specific measurement functions are described in Clause 14 of TS 25.331. Within a Measurement Control message (not shown) the UTRAN notifies the UE which events should trigger a measurement report. The listed events are the toolbox from which the UTRAN can choose the reporting events that are needed for the implemented handover evaluation function, or other radio network functions. The SRNC performs a procedure within the signal processor to determine if there is a need for a radio link addition. See 3GPP TR 25.931 v6.2.0 (2005-06), "Technical Specification Group RAN; UTRAN functions, examples on signalling procedures (Release 6)." If so, after performing the procedures described below, an ACTIVE SET UPDATE message is sent from the SRNC to the UE via the Node B and is used by the UTRAN to add, replace or delete radio links in the active set of the UE (see Clause 10.2.1 of TS 25.331 v6.6.0 (2005-06) for a description of the ACTIVE SET UPDATE message).

The actions in the Node B when receiving the enhanced RL Addition request message at the right hand side of FIG. 3 will now be described. First of all, the RL Addition request message 600 is enhanced as shown in FIG. 6A by including new information 602 about the new HS-DSCH Serving Cell which is identified by the HS-PDSCH RL ID as well as the same information as specified in Release 99 about the new RL. The RL Addition request message 600 of FIG. 6A may also contain a connection frame number (CFN). In response to the RL Addition request message 600 the Node B first adds the new RL into the NBCC (Node B communication context). If the RL Addition request message 600 contains HS-PDSCH RL ID, HS-DSCH RNTI and the CFN indicating when the new HS-DSCH serving cell will be activated, the Node B prepares the new configuration and responds back to the SRNC with the enhanced RL Addition response message 700 of FIG. 7A. The Node B then activates the new HS-DSCH serving cell in the CFN which was included in the RL Addition Request message 600. If the RL Addition Request message 600 doesn't contain the CFN, Node B activates the HS-DSCH Serving Cell change after including the new RL into the NBCC. If the new RL in the RL Addition Request message 600 is in the cell, which is different compared to the new HS-DSCH serving cell, the addition of RL in NBCC and HS-DSCH serving cell change can be done independently of each other and in a specific order that is dictated by the implementation. The E-DCH procedure is similar, except using the appropriate new IEs shown in FIG. 6B.

Referring to FIG. 4, the actions performed in Node B when receiving the enhanced RL Deletion Request message will now be described. The enhanced RL Deletion Request message 710 contains the RL to be deleted as in the old Release 99 information element but also contains a new IE identifying the HS-DSCH serving cell shown as HS-PDSCH RL ID in the IE/Group 602 of FIG. 6A. In response, the Node B deletes the first requested RL from the NBCC. If RL Deletion Request message 604 contains HS-PDSCH RL ID, HS-DSCH RNTI and the CFN when the new HS-DSCH serving cell will be activated, Node B prepares the new configuration and responds back to SRNC with the enhanced RL Deletion Response message 710 as shown in FIG. 7A with new information elements added as appropriate for HS-DSCH. Node B then activates the new HS-DSCH serving cell in the CFN which was included in RL Addition Request message. If RL Deletion Request message doesn't contain the CFN, Node B activates the HS-DSCH serving cell change after deleting the RL from the NBCC. The order of deletion of the RL and HS-DSCH serving cell change can be done according to the specific order desired in the implementation. The E-DCH procedure is similar, using the appropriate new IEs 720 shown in FIG. 7B.

Figure 8:
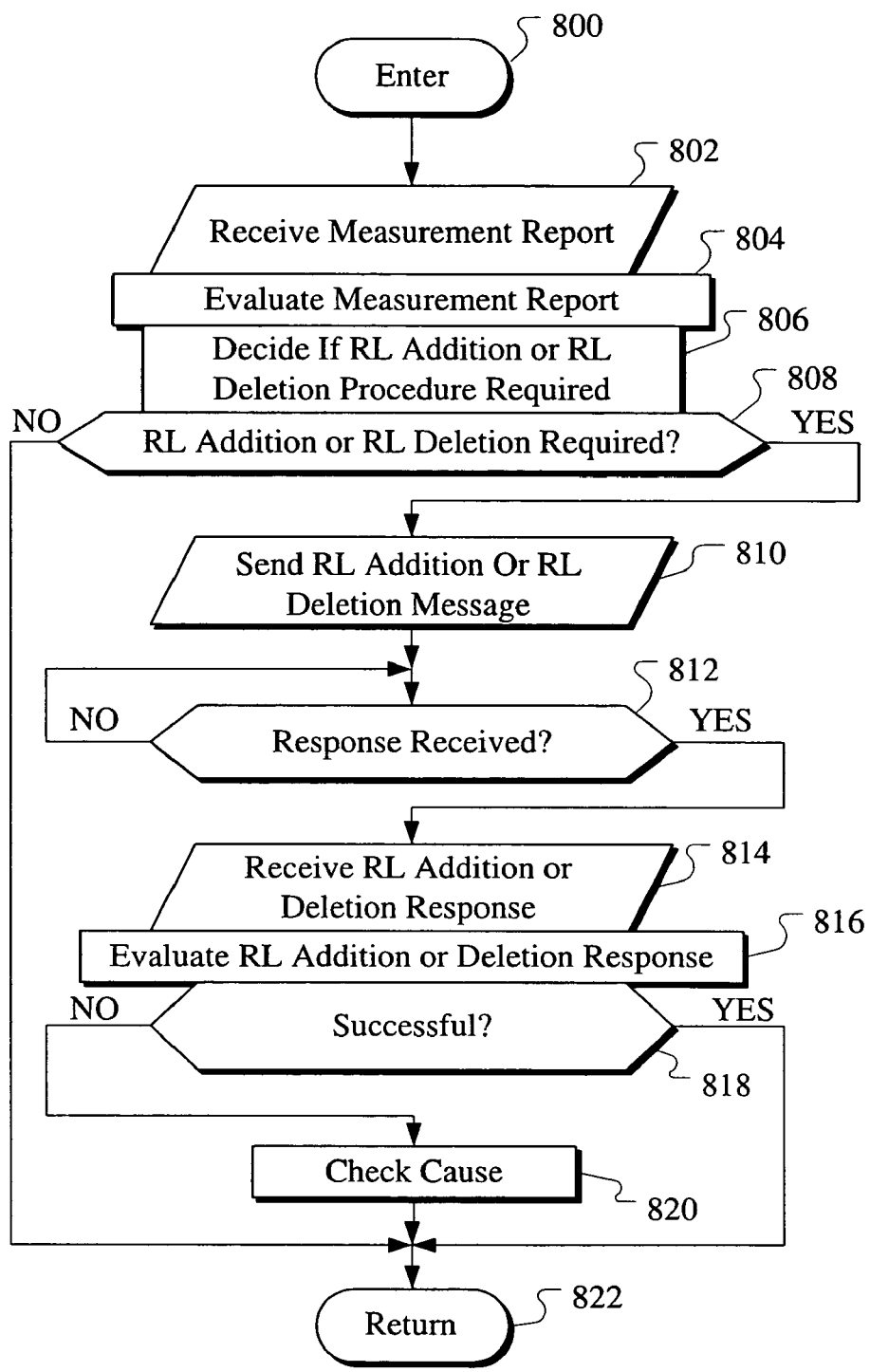
FIG. 8 shows a flowchart illustrating a series of procedural steps which may take place in a network element such as the serving radio network controller of FIG. 3 or 4.

FIG. 8 is a flow chart illustrating a series of procedural steps which may take place in a network element such as the serving radio network controller (SRNC) of FIG. 3 or 4. The illustrated steps may be encoded into computer executable code written in a computer programming language. Such computer code can be stored in a read only memory such as the ROM 900 shown in FIG. 9 within a signal processor 902. Such a signal processor could be used for instance in the SRNC of FIG. 5 for carrying out the procedural steps shown in FIG. 8. Included within such a signal processor 902 is a data, address and control bus 904 used to interconnect a variety of components such as but not limited to a central processing unit 906, a random access memory 908, a clock 910, an input/output device 912, and other devices shown generally at reference numeral 914. The central processing unit 906 executes the coded instructions stored on the ROM 900 while storing the results of intermediate computations and results in the RAM 908. The RAM 908 may also be used to store the measurement report received from the UE which may be consulted by the CPU 906 for purposes of carrying out the coded instructions stored on the ROM 900 and for formulating the RL Addition Request message sent on the line 600 in FIG. 3 or the RL Deletion Request message sent on the line 604 in FIG. 4. Referring back to FIG. 8, after entering in a step 800, a step 802 is carried out to receive the measurement report from the UE shown in FIGS. 3 and 4. The measurement report is evaluated in a step 804 and a decision made in a step 806 whether a radio link addition or radio link deletion procedure is required or not. A decision step 808 determines whether such a message is required or not and, if so, the appropriate message is formulated and sent in a step 810 to the Node B as shown for example by the RL Addition Request message on the line 600 of FIG. 3 or the RL Deletion Request message on the line 604 in FIG. 4. The SRNC then waits for a response as shown in a decision step 812 where, once a determination is made that a response has been received, a step 814 is executed to actually receive and process an RL Addition Response message or an RL Deletion Response message as shown for instance on the lines 700 and 710 in FIGS. 3 and 4, respectively. The SRNC then evaluates the received message as shown for instance in a step 816. A determination is made in a step 818 as to whether the request has been successful or not. If not, the cause of the failure is checked in a step 820. If successful, a return is made in a step 822. A return may also be made in the step 822 directly from the decision step 808 if it is determined that an RL Addition or Deletion is not required.

Referring now to FIG. 10, a procedure for execution in user equipment is shown by way of a flow chart, according to the present invention. After entering in a step 1000, a sending step 1002 is executed to send the measurement report shown in FIGS. 3 and 4 from the user equipment to the SRNC. After a period of time, the user equipment receives an active set update message from the SRNC as shown in a step 1004 and corresponding to the active set update messages shown in FIGS. 3 and 4. The user equipment then updates the active set in a step 106 and subsequently receives HSDPA data from the new cell as shown in a step 1008 after which a return is shown in a step 1010.

Referring now to FIG. 11, a procedure is shown for execution in a network element such as the Node B shown in FIGS. 3-5. After entering in a step 1100, a step 1102 is executed to receive a radio link addition message or a radio link deletion message from another network element such as the SRNC of FIGS. 3-5. Such a signal is shown for example in FIGS. 3 and 4 by the signal on the line 600 in FIG. 3 or the signal on the line 604 in FIG. 4. The Node B evaluates the received message as shown in a step 1104 and prepares a response message in a step 1106. The Node B then sends a radio link addition response message or a radio link deletion response message back to the SRNC as shown by a signal on a line 700 in FIG. 3 or a signal on a line 710 in FIG. 4 as illustrated by the step 1108 in FIG. 11. A return is then made in a step 1110 as shown in FIG. 11.

Although the invention has been shown and described with respect to specific embodiments, thereof, it should be realized that many other embodiments are possible within the scope of the appended claims.

The invention claimed is:

1. A non-transitory computer-readable medium having computer program code stored thereon for processing by a signal processor configured to cause a radio network controller at least to:
    transmit a radio link addition request message to a base station according to a standard mobility procedure in a wireless telecommunications system and to receive a response thereto where both a serving cell change and a radio link addition are called for at a same time, said radio link addition request message comprising both a request to add a radio link to a communication context for a user equipment and information concerning a serving cell change so as to avoid a separate serving cell change procedure otherwise performed prior or subsequent to a separate radio link addition procedure when there are not both said serving cell change and said radio link addition called for at the same time.

2. The non-transitory computer-readable medium of claim 1, wherein said request optionally including an information element identifying a connection frame number comprising a high-speed data packet access connection frame number and said radio link identification is of a high speed physical downlink shared channel.

3. The non-transitory computer-readable medium of claim 1, wherein said signal processor is configured to process said computer program code to cause said radio network controller to receive a response to said request from said base station, said response including an information element identifying a serving cell change response information element indicative of success or failure of the serving cell change.

4. The non-transitory computer-readable medium of claim 2, wherein each radio link addition message comprises a response to said request, said response including an information element identifying a serving cell change response information element.

5. The non-transitory computer-readable medium of claim 3, wherein said response includes an information element indicative of a medium access control indicator.

6. The non-transitory computer-readable medium of claim 3, wherein said response includes an information element indicative of a radio network temporary identifier.

7. The non-transitory computer-readable medium of claim 5, wherein said response includes an information element indicative of a radio network temporary identifier.

8. A network element comprising a processor and memory including computer program code, the memory and the computer program code configured to, with the processor, cause the network element at least, in response to a measurement report message from user equipment, to:
    provide a combined radio link addition and serving cell change message to another network element of a wireless telecommunications system when both a serving cell change and a radio link addition are called for at a same time and
    receive a response message with a successful or unsuccessful indication of addition of said radio link, said combined radio link addition and serving cell change message comprising an information element including a radio link identification and an information element including high speed downlink shared channel serving cell change information, said combined message avoiding a separate serving cell change procedure otherwise performed prior or subsequent to a separate radio link addition procedure between said network element and said another network element when there are not both said serving cell change and said radio link addition called for at the same time.

9. A user equipment comprising
    a processor and
    at least one memory including computer program code, the memory and the computer program code configured to, with the processor, cause the user equipment to:
    provide a measurement report to a network element having information relating to neighboring cells and, in case both a serving cell change and a radio link addition are called for at a same time,
    receive from said network element an active set update message optionally including an information element identifying a connection frame number wherein said information identifying a connection frame number is also sent from said network element to another network element in a radio link addition message that combines a request to add said radio link and information concerning a serving cell change so as to avoid performance of a separate serving cell change procedure otherwise performed prior to or subsequent to a separate radio link addition procedure between said network element and said other network element when there are not both said serving cell change and said radio link addition called for at the same time.

10. A network element comprising a processor and memory including computer program code, the memory and the computer program code configured to, with the processor, cause the network element at least, in response to a combined radio link addition and serving cell change message from another network element in case both a serving cell change and a radio link addition are called for at a same time, to add a radio link and to provide a radio link addition response message to said other network element, said combined message comprising an information element including a radio link identification and an information element including high speed downlink shared channel serving cell change information, said message optionally including an information element identifying a connection frame number comprising a high-speed data packet access connection frame number and said radio link identification is of a high speed physical downlink shared channel, wherein said combined radio link addition and serving cell change message avoids performance of a separate serving cell change procedure otherwise performed prior or subsequent to a separate radio link addition procedure performed between said network element and said other network element when there are not both said serving cell change procedure and said radio link addition procedure called for at the same time.

11. A system, comprising:
    a first network element, responsive to a measurement report from user equipment having information relating to neighboring cells of said system for providing an active set update message to said user equipment and, in case both a serving cell change and a radio link addition are called for at a same time, for providing a combined radio link addition and serving cell change request message including information relating to said serving cell change and said radio link addition so as to avoid execution, not at the same time, of a separate cell change procedure and a separate radio link addition procedure; and
    a second network element, responsive to said combined radio link addition and serving cell change request message, for providing a radio link addition response message to said first network element.

12. The system of claim 11, wherein said first network element is also responsive to said radio link addition response message for providing said active set update message.

13. A method for execution in user equipment, comprising:
providing a measurement report to a network element having information relating to neighboring cells, and
receiving from said network element an active set update message optionally including information relating to a connection frame number wherein, in case both a serving cell change and a radio link addition are called for at a same time, said information relating to said connection frame number is also optionally sent from said network element to another network element in a combined radio link addition and serving cell change message to enable a combined radio link addition and serving cell change procedure between said network element and said another network element so as to avoid execution, not at the same time, of a separate cell change procedure prior or subsequent to a separate radio link addition procedure between said network element and said another network element and wherein said another network element is for communicating by radio with said user equipment.

14. A method, for execution in a network element, comprising:
receiving a measurement report message from user equipment, and
providing, in case both a serving cell change and a radio link addition are called for at a same time, a combined radio link addition and serving cell change message to another network element, wherein a serving cell change information element is optionally included in said combined radio link addition and serving cell change message to enable a combined radio link addition and serving cell change procedure between said network element and said another network element so as to avoid execution, not at the same time, of a separate cell change procedure prior or subsequent to a separate radio link addition procedure between said network element and said another network element.

15. A method, for execution in a network element, comprising: receiving a radio link addition message from another network element having an optional information element identifying a connection frame number to enable, in case both a serving cell change and a radio link addition are called for at a same time, a combined radio link addition and serving cell change procedure between said network element and said another network element so as to avoid execution, not at the same time, of a separate cell change procedure prior or subsequent to a separate radio link addition procedure between said network element and said another network element, and
providing a response message to said another network element for enabling said another network element to send an active set update message to user equipment with said information element identifying a connection frame number.

16. A non-transitory computer readable medium having a computer program stored thereon for processing radio link addition messages and responses thereto relating to a mobility procedure in a wireless telecommunication system where both a serving cell change and a radio link addition are called for at a same time, each message comprising both a request to add a radio link to a communication context for a user equipment and information concerning a serving cell change so as to avoid execution, not at the same time, of a separate cell change procedure used when there are not both said serving cell change and said radio link addition called for at the same time.

17. The non-transitory computer readable medium of claim 16, wherein said request optionally includes an information element identifying a connection frame number comprising a high-speed data packet access connection frame number and said radio link identification is of a high speed physical downlink shared channel.

18. An integrated circuit comprising a signal processor for processing radio link addition messages relating to a mobility procedure in a wireless telecommunication system where both a serving cell change and a radio link addition are called for at a same time, each message comprising both a request to add a radio link to a communication context for a user equipment and information concerning a serving cell change so as to avoid execution, not at the same time, of a separate cell change procedure used when there are not both said serving cell change and said radio link addition called for at the same time.

19. The integrated circuit of claim 18, wherein said request optionally includes an information element identifying a connection frame number comprising a high-speed data packet access connection frame number and said radio link identification is of a high speed physical downlink shared channel.

20. An apparatus, comprising:
transmitter for providing a measurement report message to a network element having information relating to neighboring cells; and
a receiver, responsive to an active set update message from said network element, said message optionally including information relating to a connection frame number wherein said information relating to said connection frame number is also optionally sent from said network element to another network element in a combined radio link addition and serving cell change message to enable a combined radio link addition and serving cell change procedure so as to avoid execution, not at the same time, of a separate serving cell change procedure prior or subsequent to a separate radio link addition procedure between said network element and said another network element, and wherein said another network element is for communicating by radio with said apparatus synchronized according to said connection frame number.

21. An apparatus, comprising:
a receiver, responsive to a measurement report message from user equipment; and a transmitter for providing, where both a serving cell change and a radio link addition are called for at a same time, a radio link addition message as a request message including both a radio link addition request and serving cell change information to another apparatus to enable a combined radio link addition and serving cell change procedure so as to avoid execution, not at the same time, of a separate serving cell change procedure prior or subsequent to a separate radio link procedure between said apparatus and said another apparatus, wherein a connection frame number is optionally included as an information element in said radio link addition message.

22. An apparatus, comprising:
a receiver responsive to a radio link addition message from another apparatus including both a radio link addition request and serving cell change information, where both a serving cell change and a radio link addition are called for at a same time, to enable a combined radio link addition and serving cell change procedure so as to avoid execution, not at the same time, of a separate serving cell change procedure prior or subsequent to a separate radio link procedure between said apparatus and said another apparatus; and a transmitter for providing a radio link addition response message to said another apparatus.

23. A system, comprising:

user equipment for sending a message report having information relating to neighboring cells;

a serving radio network controller, responsive to said measurement report from said user equipment, for providing a combined radio link addition and serving cell change message having an optional information element identifying a connection frame number; and a base station, responsive to said combined radio link addition and serving cell change message, for sending a response message to said serving radio network controller wherein, in response to receipt of said response message from said base station, said serving radio network controller sends an active set update message with said optional information element identifying said connection frame number to said user equipment for use by said user equipment in selecting a proper frame number to begin receiving information from an added radio link, said system thereby avoiding any need to perform a separate serving cell change procedure.

24. A system, comprising:

a serving radio network controller, responsive to a measurement report message having information relating to neighboring cells, for sending an active set update message with an optional connection frame number information element to said user equipment, and for sending a combined radio link deletion and serving cell change message with said optional connection frame number information element; and a base station, responsive to said combined radio link deletion and serving cell change message with said optional connection frame number information element, for sending to said serving radio network controller a response message whereafter data is sendable from said serving radio network controller to said user equipment via said base station using said optional connection frame number information element, said system thereby avoiding any need to perform a separate serving cell change procedure between said serving radio network controller and said base station when both a serving cell change and a radio link addition are called for at a same time.

25. An apparatus, comprising:

means for receiving a measurement report message from user equipment; and means for providing a combined radio link addition and serving cell change message as a request message to another apparatus, wherein a connection frame number is optionally included as an information element in said radio link addition message, said apparatus thereby avoiding any need to perform a separate serving cell change procedure when both a serving cell change and a radio link addition are called for at a same time.

26. The apparatus of claim 25, further comprising means responsive to a response message from said other apparatus for providing an active set update message to said user equipment including said connection frame number as an information element of said active set update message.

27. The apparatus of claim 26, wherein the user equipment is able to receive data using said connection frame number.

28. An apparatus comprising a processor and memory including computer program code, the memory and the computer program code configured to, with the processor, cause the apparatus to provide a measurement report to a network element having information relating to neighboring cells, and receive from said network element an active set update message optionally including information relating to a connection frame number wherein said information relating to said connection frame number is also optionally sent from said network element to another network element in a combined radio link addition and serving cell update message to enable execution of a combined radio link addition and serving cell change procedure between said network element and said another network element, when both a serving cell change and a radio link addition are called for at a same time, so as to avoid execution of a separate serving cell change procedure prior or subsequent to a separate radio link addition procedure between said network element and said another network element and wherein said another network element is for communicating by radio with said user equipment.

29. An apparatus, comprising a processor and memory including computer program code, the memory and the computer program code configured to, with the processor, cause the apparatus at least to receive a measurement report message from user equipment, and provide, in case both a serving cell change and a radio link addition are called for at a same time, a radio link addition message as both a radio link addition request message and a serving cell change message to another apparatus to enable execution of a combined radio link addition and serving cell change procedure between said network element and said other network element so as to avoid execution of a separate serving cell change procedure prior or subsequent to a separate radio link addition procedure between said network element and said other network element, wherein a connection frame number is optionally included as an information element in said radio link addition message.

30. An apparatus, comprising a processor and memory including computer program code, the memory and the computer program code configured to, with the processor, cause the apparatus at least to receive a combined radio link addition and serving cell change message from another apparatus to enable execution of a combined radio link addition and serving cell change procedure between said network element and said other network element so as to avoid execution of a separate serving cell change procedure prior or subsequent to a separate radio link addition procedure between said network element and said other network element, and provide a response message to said another network element.

31. A non-transitory computer-readable storage medium having computer program code stored thereon for processing by a signal processor configured to cause a radio network controller to transfer data in a combined radio link addition and serving cell change message of a mobility procedure in a wireless telecommunications system, where both a serving cell change and a radio link addition are called for at a same time, each message for transferring said data in a data structure according to a standard, wherein said data in said combined radio link addition and serving cell change message comprises a request including an information element including a radio link identification and an information element including high speed downlink shared channel serving cell change information and combined so as to avoid a separate serving cell change procedure otherwise performed prior or subsequent to a separate radio link addition procedure when there are not both said serving call change and said radio link addition called for at the time, wherein said combined radio link addition and serving cell change message comprises a request including an information element identifying a serving enhanced dedicated channel radio link.

32. The non-transitory computer-readable storage medium of claim 31, wherein said signal processor is configured to process said said computer program code to cause said radio network controller to receive a response to said request, said response including an information element identifying a serving cell change response information element indicating success or failure of the serving cell change.

* * * * *